United States Patent [19]

Seer, Jr.

[11] 4,009,489
[45] Feb. 22, 1977

[54] NEGATIVE COLOR FILM MASK CORRECTION

[75] Inventor: Harold George Seer, Jr., Woodbury, N.J.

[73] Assignee: RCA Corporation, New York, N.Y.

[22] Filed: Feb. 26, 1976

[21] Appl. No.: 661,615

[30] Foreign Application Priority Data

Aug. 6, 1975 United Kingdom ............ 32843/75

[52] U.S. Cl. .................................. 358/80; 358/54; 358/6
[51] Int. Cl.² ..................... G03F 3/08; H04N 9/11; H04N 5/84
[58] Field of Search ...................... 358/80, 6, 54, 76

[56] References Cited

UNITED STATES PATENTS 3,005,042  10/1961  Horsley .......................... 358/6

*Primary Examiner*—John C. Martin
*Assistant Examiner*—Aristotelis M. Psitos
*Attorney, Agent, or Firm*—Eugene M. Whitacre; Mason DeCamillis

[57] ABSTRACT

Negative color film is processed in a color telecine camera by the selection of an optical filter which provides equal light transmission for the red and green colors so as to produce equal red and green video signals. The electrical gain of the blue channel is then increased to produce a blue video signal equal to the red and green video signals.

5 Claims, 1 Drawing Figure

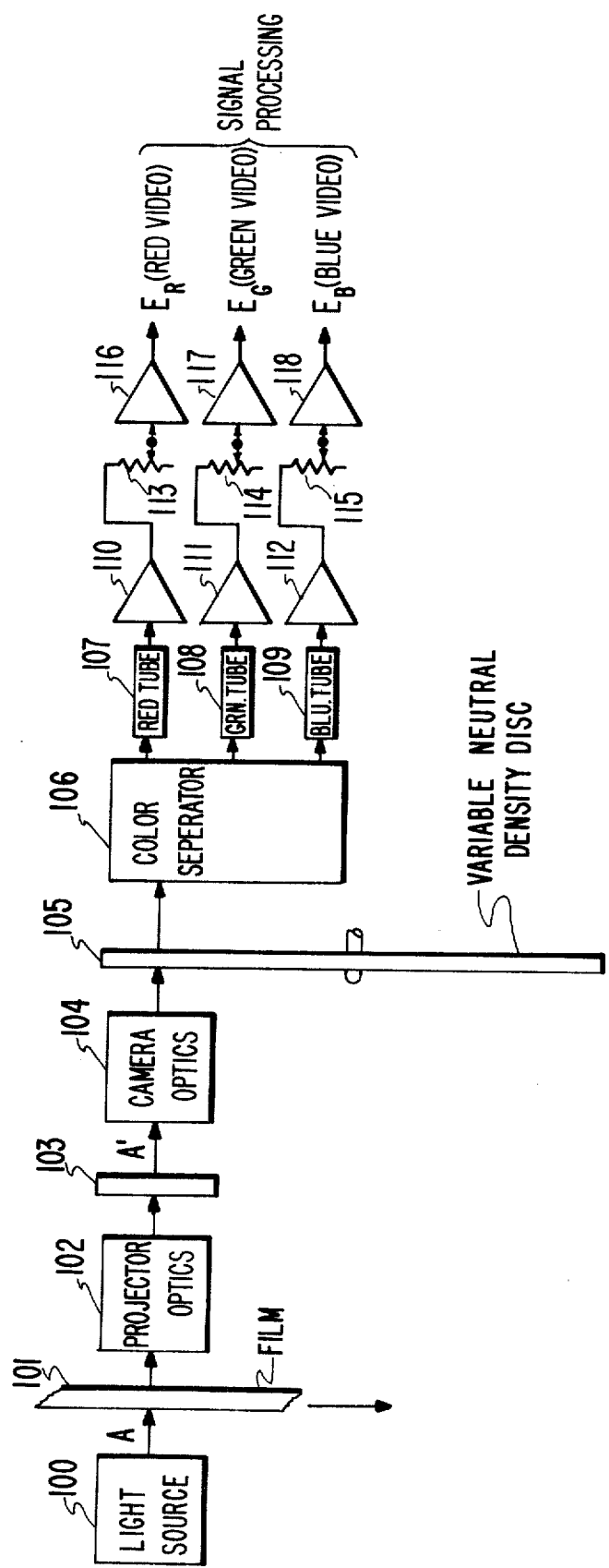

NEGATIVE COLOR FILM MASK CORRECTION

BACKGROUND OF THE INVENTION

This invention relates to the playback of color picture information contained on a record such as motion picture film and, in particular, to the playback of negative film records for television programming.

Television broadcasting systems make significant use of motion picture film to complement live telecasting and prerecorded video tape sources in preparing program content.

Motion picture film sources typically comprise feature length films, commercials for advertising purposes and on-the-spot film clips of news events. Typical operating techniques for including such film sources in the program content involve the use of a telecine camera, such as the RCA TK-28, manufactured by RCA Corporation at Camden, New Jersey. Telecine cameras basically include a light source for illuminating the film, a film transport for moving the film and a television camera system to receive the illuminated film information for conversion to an electrical video signal representative of the film image information. Since the television camera portion of a telecine camera is similar to a live television camera, positive film prints made from a negative film are generally utilized, because such positive prints are color balanced; that is, equal amounts of red, green and blue colors yield white, thereby permitting direct viewing of the positive film by the camera system. However, the making of positive prints from the original negative film requires at least one extra processing step which takes time and results in a degradation of resolution as well as color saturation of the resulting positive print relative to the negative.

In view of the loss of original picture quality and the time saving possible, it would be desirable to utilize the negative film directly in the telecine cameras. A direct substitution of negative film in the telecine camera is not possible, however, unless significant changes are made in the camera system. The primary difficulty in such a direct substitution lies in the nature of negative film. As previously described, positive film is color balanced so that the transmission of light through the film is equal for red, green and blue colors, whereas, a negative film is not so balanced. A typical negative color film, for example, Eastman type 5254, has a light transmission of 71.45% red, 23.01% green and 4.898% blue.

To better understand the difficulty posed by a direct substitution of negative film in a telecine camera designed for positive film, it will be helpful to briefly review the set-up procedure for a typical telecine camera, such as the aforementioned TK-28 film camera. A film camera is usually adjusted so that when there is no film or filters in the light path from the light source to the image pickup tubes, the red, green and blue video signal outputs from the camera are of equal amplitude corresponding to white light. The variable neutral density disk commonly used in telecine cameras under these conditions is set so as to reduce the light input to the camera image pickup tubes by a factor of 10 to 1. With no film and the abovementioned disk at its low limit, the gain controls of the video amplifiers coupled to the image pickup tubes are adjusted to produce a 100% video output level. Since the maximum transmission through positive color film is approximately 50%, this allows the disk to maintain a constant video level for a film density highlight ratio of 5 to 1.

If a typical negative film, such as the Eastman type 5254 previously described, is inserted into the telecine camera, the unequal light transmission for the three primary colors will result in an unbalanced video signal output since the camera was adjusted for equal light transmission for the primary colors.

Prior art attempts to correct for this unbalance generally called for equalizing the light transmission of the negative film by inserting filters in the light path to the camera, for example, prior to the image pickup tubes, so as to reduce the red and green light transmission to match the blue light transmission of the negative film. When this method of equalization is utilized for a typical negative film, the resulting video output signal amplitude is reduced to 23% of its original 100% level with the neutral density disk at its thin limit. In order to restore the 100% level normally required for signal processing, the amplification factor of the video signal amplifiers must be increased by 1/.23 or 435%, thus raising the typical noise level in the output signal by a factor of 4.35 times. Alternatively, if optical filters are not used, the individual gain for each image pickup amplifier must be compensated so as to achieve the desired 100% video output level which results in a noise factor increase of 3.65 times. This latter solution, although an improvement over the noise factor increase of 4.35, requires a gain adjustment of the three video signal processing channels in a changeover from a feature film, which is almost always a positive print, to a commercial or news spot negative film.

SUMMARY OF THE INVENTION

In accordance with the present invention, apparatus for processing negative color film having unequal light transmission for red, green and blue light components in a telecine camera which develops red, green and blue color video signals, comprises optical filter means for equalizing the red and green light transmission of the negative film for developing equal red and green video signals from the camera, and signal gain adjustment means for increasing the blue color video signal for developing a blue video signal equal to the red and green video signals.

DESCRIPTION OF THE INVENTION

FIG. 1 is a block diagram of the basic components of a telecine camera for developing video signals from a film source of image information.

A light source 100 illuminates a film 101, the image of which is coupled to projector optics 102 along light path A-A'. Camera optics 104 receives the projected film image and, in turn, couples the image to a color separator 106, for example, a color splitting prism, in which the incoming image light is separated into its red, green and blue components. Coupled to the output of the color slitting prism are, respectively, red, green and blue image pickup tubes 107, 108, 109, which typically are vidicons. The electrical output signals corresponding to the red, green and blue image content are coupled to respective preamplifiers 110, 111 and 112. The output signals from preamplifiers 110, 111 and 112 are coupled to respective input terminals of processing amplifiers 116, 117 and 118 by means of gain control adjustments 113, 114 and 115, respectively. The output signals from processing amplifiers 116, 117 and 118, shown respectively as $E_R$, $E_G$ and $E_B$, represent the illuminated film image in its three primary colors. Further signal processing in a well-known manner matrixes these primary color signals into the desired television video signal $E_y$ with color component ratios of $0.3E_{Red} + 0.59E_{Green} + 0.11E_{Blue}$.

In accordance with the principles of the present invention, a negative color film having a typical light transmission of 71.45% red, 23.01% green and 4.898% blue may be substituted for a positive balanced color film at position 101 in the camera system of FIG. 1, and an improved balance of the three output video signals $E_R$, $E_G$ and $E_B$ may be obtained in the following manner. A light filter 103 is inserted into the light path A-A' which optically matches the red image light output to the green image light output in a known manner. By way of example, a suitable filter 103, for a typical negative film such as Eastman 5254, may be assembled using two Kodak No. CC40C wratten filters. The use of filter 103 provides red and green light transmission of approximately 14% and blue light transmission of approximately 7%. Since the red and green light transmission is now equal, it is only necessary to increase the electrical gain of the blue light channel in order to balance the three output video signals $E_R$, $E_G$ and $E_B$; thus, if gain adjustment 115 is increased by a factor of two, the output video signals are balanced as for the case where positive film is used. In order to restore the 100% video output level, the variable neutral density disk 105 is rotated, either manually or by automatic highlight sensing circuits, in a known manner, to achieve the required increase in illumination. The resulting noise increase in the output signal expressed in mathematical form is:

$$\frac{\sqrt{(.3E_R)^2 + (.59E_G)^2 + (2 \times .11E_B)^2}}{\sqrt{(.3E_R)^2 + (.59E_G)^2 + (.11E_B)^2}} = 1.04$$

The above-described method of balancing the unequal light transmission of negative film provides an approximate 4 to 1 improvement in signal-to-noise over the known prior art methods and greatly improves the signal quality as well as minimizing the complexity of the electrical signal processing of the resultant video signal.

As previously referred to, the use of negative film directly in a telecine camera makes possible a higher quality of reproduction in regard to resolution and color saturation of the recorded film image and at the same time eliminates the lost time and cost involved in processing negative film into positive film prints. However, there usually exists only one original negative film and multiple copies may be desired, particularly for filmed commercials. An advantageous method of making duplicate copies while preserving the quality of the original negative film is to use a videotape recorder (VTR) in conjunction with the telecine camera. In typical use, the composite video signal output of the telecine camera developed from original negative film is coupled to one or more VTR's which provides duplicates in a prerecorded magnetic tape format. The duplicates thus obtained are of very high quality and are in a desirable form for distribution and playback in standard programming channels.

What is claimed is:
1. Apparatus for processing negative color film in a telecine camera which develops red, green and blue color video signals, said negative film having unequal light transmission for red, green and blue light components, comprising:
   optical filter means for equalizing said red and green light transmission of said film for developing equal red and green video signals from said camera; and
   gain adjustment means for increasing the blue color video signal for developing a blue video signal equal to said red and green video signals.
2. In a telecine camera according to claim 1 wherein the light transmission of said negative film is greatest for red light components and minimum for blue light components of said light source.
3. In a telecine camera having a light source, a film transport, and a color camera in a common light path for developing equal red, green and blue color video signals from negative color film having unequal light transmission for red, green and blue light components, comprising:
   optical filter means located in said light path for equalizing red and green light transmission from said film for developing equal red and green video signals from said camera; and
   gain adjustment means coupled to said camera for increasing the blue color video signal for developing a blue color signal equal to said red and green video signal from said camera.
4. In a telecine camera according to claim 3 wherein the light transmission of said negative film is greatest for red light components and minimum for blue light components of said light source.
5. In a telecine camera according to claim 4 wherein said common light path further includes a variable neutral density disk for increasing the filtered red, green and blue light components to a 100% value after said filter.

* * * * *